United States Patent
Sommer

[11] Patent Number: 5,190,129
[45] Date of Patent: Mar. 2, 1993

[54] PRESS DRIVE WITH OIL SHEAR CLUTCH/BRAKE DRIVES

[75] Inventor: Gordon M. Sommer, Grosse Pointe Farms, Mich.

[73] Assignee: Midwest Brake Bond Co., Warren, Mich.

[21] Appl. No.: 825,043

[22] Filed: Jan. 24, 1992

[51] Int. Cl.$^5$ ............................................. F16D 67/04
[52] U.S. Cl. .................................. 192/18 A; 192/12 C; 192/91 A
[58] Field of Search ................. 192/12 C, 18 A, 18 R, 192/91 A

[56] References Cited

U.S. PATENT DOCUMENTS

| | | | |
|---|---|---|---|
| 2,918,832 | 12/1959 | Meyers | 192/18 A |
| 3,089,574 | 5/1963 | Howard | 192/48.1 |
| 3,494,450 | 2/1970 | Mankowsky et al. | 192/18 A |
| 3,614,999 | 10/1971 | Sommer | 192/18 A |
| 3,696,898 | 10/1972 | Sommer | 192/18 A |
| 3,713,517 | 1/1973 | Sommer | 192/18 A |
| 3,970,176 | 7/1976 | Bucksch | 192/18 A X |
| 3,971,461 | 7/1976 | Conroy et al. | 192/18 A |
| 4,096,931 | 6/1978 | Whitehurst | 192/18 A |
| 4,135,611 | 1/1979 | Spanke | 192/18 A |
| 4,183,425 | 1/1980 | Sommer | 192/113 |
| 4,432,443 | 2/1984 | Sommer | 192/12 R |
| 4,516,444 | 5/1985 | Herr | 192/12 CX |
| 4,552,255 | 11/1985 | Sommer | 192/18 A |
| 4,577,738 | 3/1986 | Yater | 192/18 A |
| 4,598,804 | 7/1986 | Sommer | 192/0.02 R |
| 4,607,736 | 8/1986 | Kelley | 192/18 A |
| 4,693,350 | 9/1987 | Sommer | 192/18 A |
| 4,921,078 | 5/1990 | Sommer | 188/171 |

Primary Examiner—Leslie A. Braun
Assistant Examiner—Nicholas Whitelaw
Attorney, Agent, or Firm—Harness, Dickey & Pierce

[57] ABSTRACT

A basic unit for driving a press is disclosed. The unit uses two hydraulic actuated oil shear brake/clutch units which are in coaxial nested relationship. The basic unit provides a core assembly which can easily be modified or adapted to be mated with any type of press drive. Once the unit has been mated to a press a continuous supply of filtered and cooled oil is provided. This supply of oil provides little or no wear on clutch plates as well as low heat generation.

4 Claims, 5 Drawing Sheets

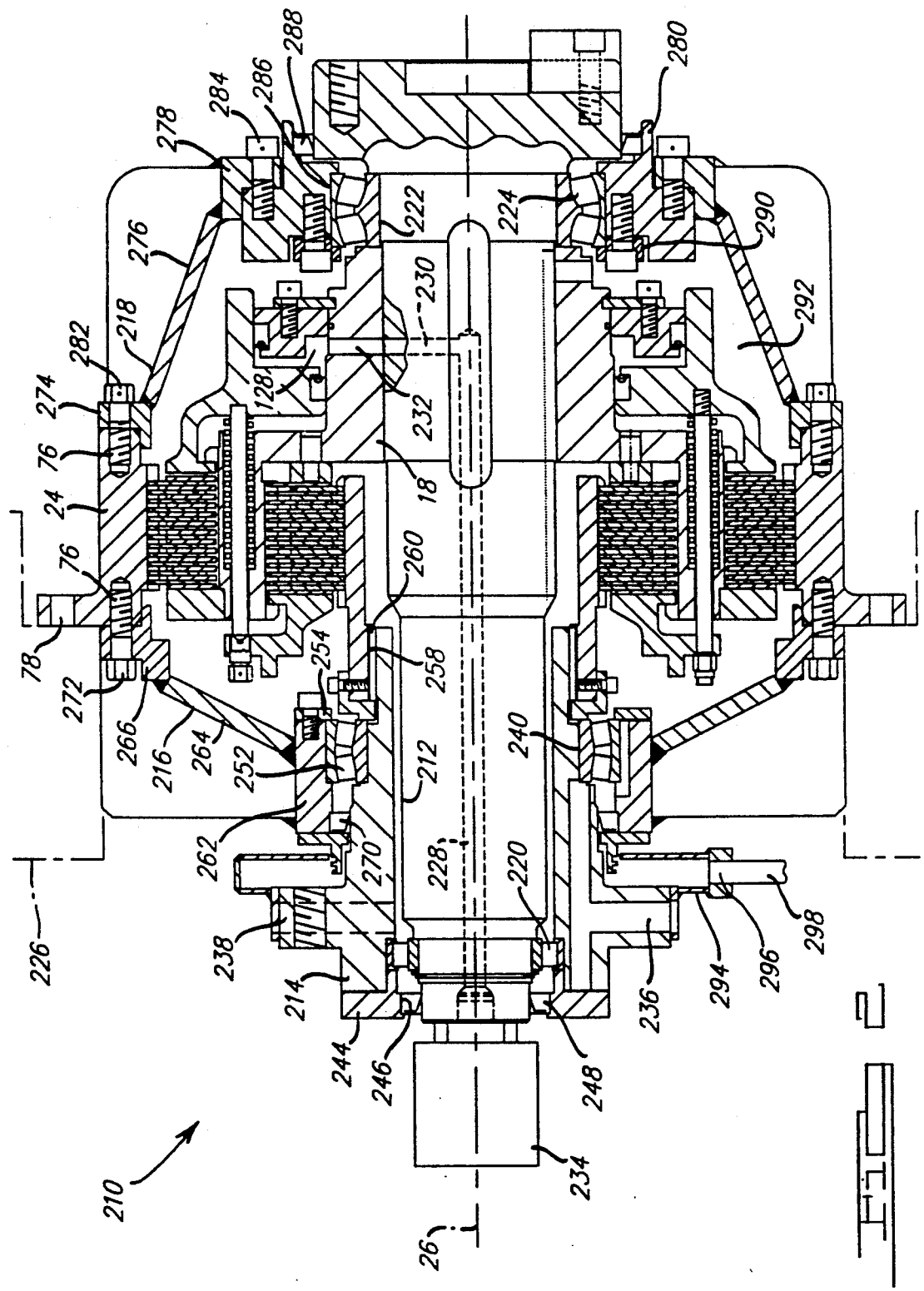

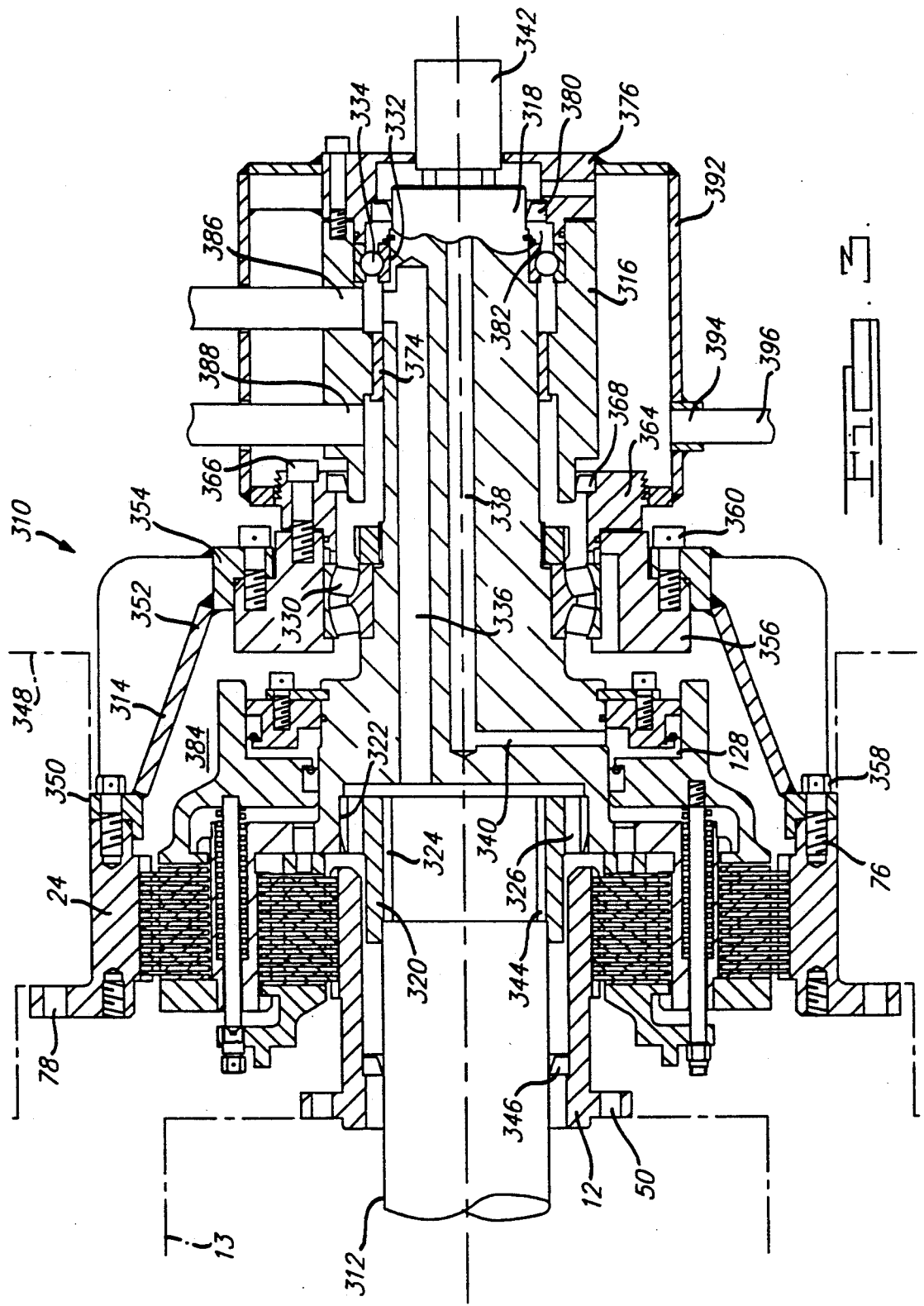

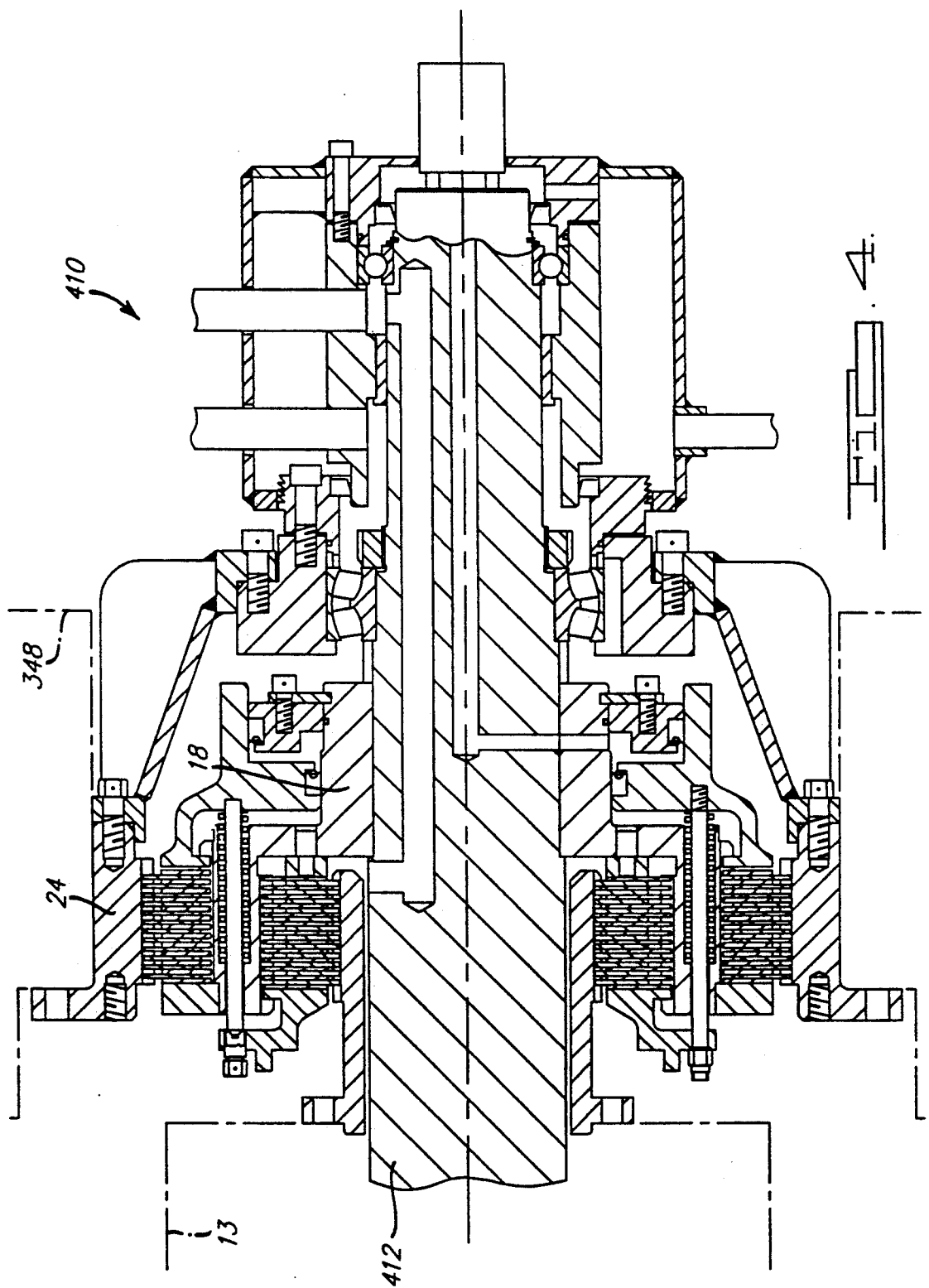

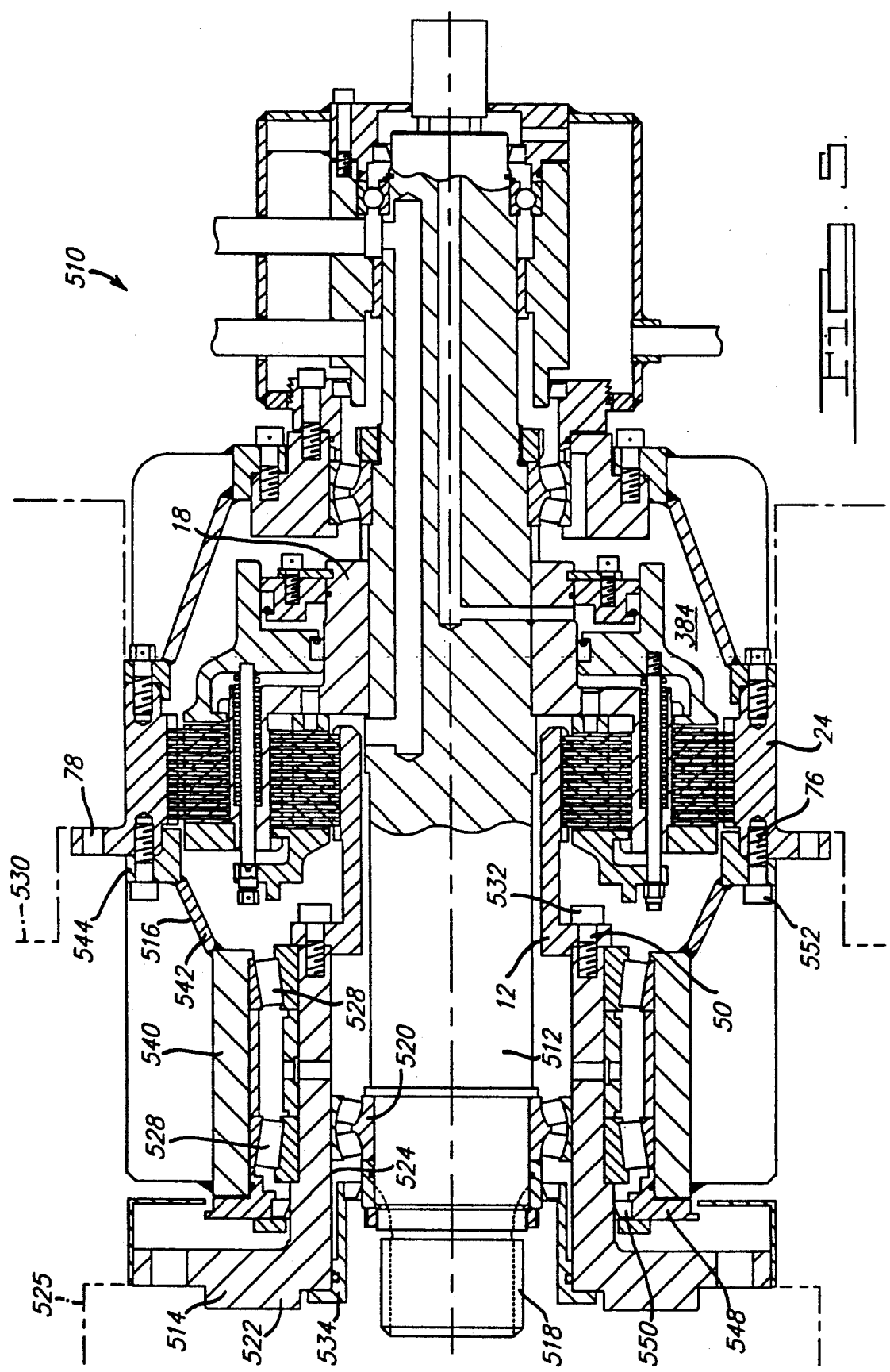

PRESS DRIVE WITH OIL SHEAR CLUTCH/BRAKE DRIVES

BACKGROUND OF THE INVENTION

The present invention relates to press drives. More particularly, the present invention relates to a single speed press drive using an oil shear clutch/brake unit.

Dry friction clutch/brakes depend upon the rubbing of a dry friction material against dry reaction members to start and stop a press. This causes wearing of both the friction material and the reaction members. It also causes heat in these members. The faster the press operates and the faster the flywheel rotates the greater the wear and heat generated. This generation of wear and heat requires periodic gap adjustment to keep the press operating correctly.

Some clutch/brakes used on presses are mechanically interlocked. Mechanical interlocking of the clutch and brake means that a single piston automatically first releases the brake and then engages the clutch on starting. For stopping, the clutch is first released and then the brake engaged. These mechanically interlocked units have most of the clutch/brake mass mounted on the driveshaft and often represent 80 percent of the total inertia of the press that the clutch/brake must stop and start.

Mechanical interlocking of dry friction clutch/brakes reduces the frequency of necessary gap adjustment but does not eliminate this procedure. Adjustment is necessary when the gap has increased sufficiently that press response is affected.

Press builders introduced low inertia clutch/brake designs in an effort to reduce the start-stop inertia. This type of design requires separate pistons to release the brake and engage the clutch. The start-stop inertia with this type design is still usually 60 percent or more of the total inertia. In order for the press to function correctly, the separate pistons must be properly synchronized to prevent overlap. When the clutch starts engaging before the brake is fully released, or, the brake starts engaging before the clutch is fully released, excessive heat is generated, and wear of the friction material and reaction member is greatly increased. Conversely, if there is too much time between the engage/release of the clutch/brake, drifting occurs resulting in sluggish operation and if the drift is high enough, it results in unsafe operation of the press.

The trip rate or cycle speed of a press equipped with a dry friction clutch/brake is limited because the mass of the unit determines its heat dissipation capacity. If this mass is increased, the inertia that must be started and stopped is increased. These factors define a closed loop from which it is impossible to escape when trying the increase the performance of the system.

Accordingly, what is needed is a press drive system which addresses the problems associated with dry friction clutch/brakes, the high inertia clutch/brake designs and the synchronization of the clutch and brake operation.

SUMMARY OF THE PRESENT INVENTION

The present invention provides the art with a press drive system which uses oil shear brake and clutch drives. The entire system uses hydraulic actuation instead of air actuation and the unit is comprised of key modules which can be easily adapted for mating with various types of presses.

Properly designed oil shear clutch/brake drives for presses offer the advantage of little or no wear of plates in the disk stacks and no brake fade. This provides a more precise operation of the press and dramatically increases press up-time.

The oil film carries the heat generated by start-stops away from the disk stacks. This removal of heat offers the advantage that there is now no practical limit in the press trip rate and flywheel speed plus it provides unlimited inching capabilities.

The clutch/brake system of the present invention uses a disk stack of multiple disks. These multiple disk surfaces can be used to greatly reduce the clutch/brake inertia thereby allowing the mechanically interlocking of the clutch and brake without inertia penalty. In addition, the multiple disk surfaces provide precise inching capability.

The mechanical interlocking of the oil shear clutch/brakes completely eliminates the need for any gap adjustment since the disks have little or no wear. This means that the press performance stays the same month after month, year after year.

DESCRIPTION OF THE DRAWINGS

Further objects, features and advantages of the present invention will become apparent from the analysis of the following written specification, the accompanying drawings and the appended claims in which:

FIG. 2 is a side view partially in cross section of the basic unit in FIG. 1 modified for adapting a press when the clutch/brake unit is mounted between bearings.

FIG. 3 is a side view partially in cross section of the basic unit in FIG. 1 modified for adapting a quill mounted press without using the drive shaft of the press.

FIG. 4 is a side view partially in cross section of the basic unit in FIG. 1 modified for adapting a quill mounted press using the drive shaft of the press.

FIG. 5 is a side view partially in cross section of the basic unit in FIG. 1 modified for adapting a press with a separately mounted clutch and brake and a flywheel which is not quill mounted.

DETAILED DESCRIPTION OF THE INVENTION

Figure 1:
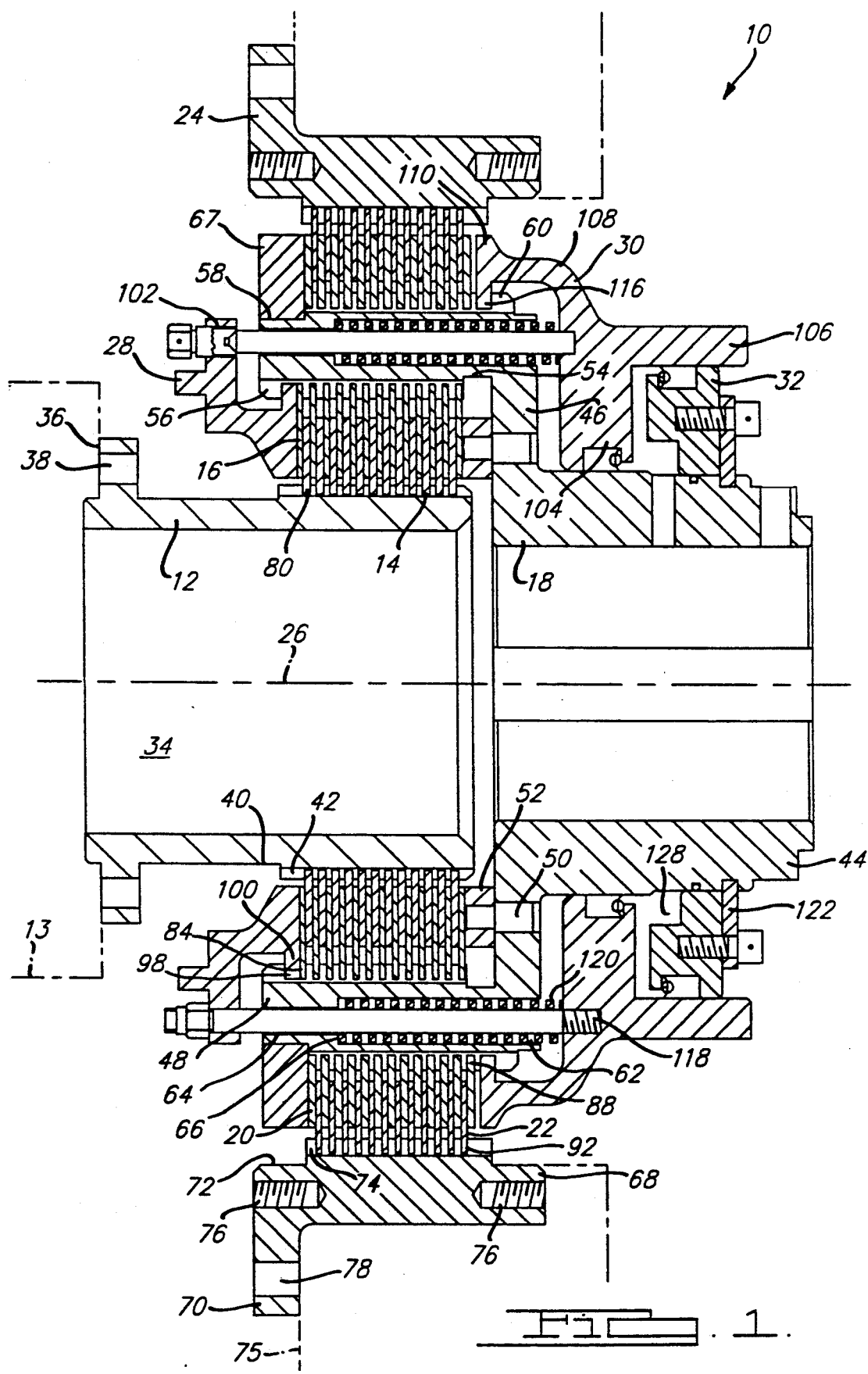
FIG. 1 is a side view partially in cross section of the basic unit for a press drive in accordance with the present invention.

The clutch/brake apparatus of the present invention begins with the basic unit shown in FIG. 1 and designated by reference numeral 10. Various embodiments will be described which incorporate the basic unit into different designs of presses. These embodiments are being included as examples on how the basic unit can be incorporated into different press designs but it is to be understood that it is possible to adapt the clutch/brake apparatus to virtually any design of press without deviating from the scope and fair meaning of the present invention.

Referring now to FIG. 1, the clutch/brake apparatus 10 includes brake reaction cylinder 12, first plurality of brake plates 14, second plurality of brake plates 16 the output means or, drive housing 18, first plurality of clutch plates 20, second plurality of clutch plates 22 the input means or, flywheel drive 24, brake engagement member 28, clutch engagement member 30 and annular ring 32.

The brake reaction cylinder 12 has a central axis 26 and forms internal cavity 34 which will be used to provide access the drive housing 18. One end of brake reaction cylinder 12 is adapted to be fixedly mounted to the frame 13 or other non-rotating member of the press or apparatus being modified. The embodiment shown in FIG. 1 has a radially extending flange 36 which has a plurality of mounting holes 38. The outside surface 40 of the other end of the reaction cylinder 12 has spline means 42 for locating the first plurality of brake plates 14.

The drive housing 18 serves as the output means and is comprised of first annular section 44, circular ring 46 and second annular section 48. The first annular section 44 is coaxial with the center axis 26 and functions as the connecting member for the drive shaft (not shown) of the various press designs as will be described later herein for the specific press designs. Circular ring 46 extends radially outward from first annular section 44 and has a plurality of holes 50 for mounting a brake reaction pad 52. The second annular section 48 extends axially from the outside of circular ring 46. The internal surface 54 of the second annular section 48 has spline means 56 for locating the second plurality of brake plates 16. The outside surface 58 of the second annular section 48 has spline means 60 for locating the first plurality of clutch plates 20. The second annular section 48 further has a plurality of circumferentially spaced axially extending spring bores 62 and a plurality of circumferentially spaced axially extending connecting rod bores 64. The connecting rod bores 64 are equal in number to, coaxial with and smaller in diameter than the plurality of spring bores 62 thus forming spring seat 66. The spring bores 62 cooperate with the connecting rod bore 64 to extend completely through second annular section 48. A clutch reaction ring 67 is fixedly attached to the end of second annular section 48 opposite the end integral with circular ring 46. The clutch reaction ring 67 extends radially outward from second annular section 48.

The flywheel drive 24 serves as the input means and is comprised of annular section 68 and circular flange 70. The interior surface 72 of the annular section 68 has spline means 74 for locating the second plurality of clutch plates 22. The circular flange 70 extends radially outward from the annular section 68. The flywheel drive is adapted to be fixedly attached to the flywheel 75 of the press being modified. The embodiment shown in FIG. 1 has a plurality of threaded holes 76 circumferentially spaced and located on both ends of annular section 68. In addition, circular flange 70 has a plurality of circumferentially spaced mounting holes 78.

The first plurality of brake plates 14 have a spline means 80 located on their interior surface. The splines means 80 cooperates with spline means 42 of brake reaction cylinder 12 to locate the first plurality of brake plates on brake reaction cylinder 12 such that rotation with respect to reaction cylinder is prohibited but the brake plates 14 are allowed to move axially. Interjected or interleaved between the first plurality of brake plates 14 are the second plurality of brake plates 16 which have spline means 84 on their exterior surface. The spline means 84 cooperates with spline means 56 of drive housing 18 to locate the second plurality of brake plates in drive housing 18 such that rotation with respect to drive housing 18 is prohibited but the brake plates 16 are allowed to move axially.

The first plurality of clutch plates 20 have a spline mean 88 located on their interior surface. The spline means 88 cooperates with spline means 60 of the drive housing 18 to locate the first plurality of clutch plates 20 on drive housing 18 such that rotation with respect to drive housing 18 is prohibited but the clutch plates 20 are allowed to move axially. Interjected or interleaved between the first plurality of clutch plates 20 are the second plurality of clutch plates 22 which have spline means 92 on the exterior surface. The spline means 92 cooperates with spline means 74 of flywheel drive 24 to locate the second plurality of clutch plates 22 in flywheel drive 24 such that rotation with respect to flywheel drive 24 is prohibited but the clutch plates 22 are allowed to move axially.

The brake engagement member 28 is located adjacent to the first and second plurality of brake plates 14 and 16 such that the brake plates 14 and 16 are disposed between the brake engagement member 28 and the brake reaction pad 52 mounted to drive housing 18. The interior surface of the brake engagement member 28 has an upwardly extending flange 98 which defines spline means 100. Spline means 100 cooperates with spine means 56 of the drive housing 18 to locate the brake engagement member 28 in drive housing 18 such that rotation with respect to drive housing 18 is prohibited but brake engagement member 28 is allowed to move axially. The brake engagement member has a plurality of circumferentially spaced mounting holes 102 for mounting connecting rod 118 as will be described later herein.

The clutch engagement member 30 is comprised of first circular ring 104, first annular section 106, second annular section 108 and second circular ring 110. The first circular ring 104 is slidingly and sealingly engaged with the exterior surface of the first annular section 44 of the drive housing 18. Integral with and axially extending from first circular ring 104 is first annular section 106. Also integral with and axially extending from first circular ring 104 in a direction opposite that of annular section 106 is second annular section 108. Integral with and located opposite the end of second annular section 108 which is attached to first circular ring 104 is second circular ring 110. The interior surface of the second circular ring 110 has spline means 116. The spline means 116 cooperates with spine means 60 of the drive housing 18 to locate the clutch engagement member 30 on drive housing 18 such that rotation with respect to drive housing 18 is prohibited but the clutch engagement member 30 is allowed to move axially. The second circular ring 110 is located adjacent to the first and second plurality of clutch plates 20 and 22 such that the clutch plates 20 and 22 are disposed between the clutch reaction ring 67 and the second circular ring 110 of the clutch engagement member 30.

The clutch engagement member 30 is fixedly attached to the brake engagement member 28 by a plurality of connecting rods 118. Connecting rods 118 extend through spring bores 62 and connecting rod bores 64 of drive housing 18 and are fixedly connected to both the clutch engagement member 30 and the brake engagement member 28. Disposed within the spring bore 62 and surrounding the plurality of connecting rods 118 are a plurality of coil springs 120. The coil springs 120 react against spring seat 66 on one end and react against the clutch engagement member 30 on the other end such that clutch engagement member 30, and the brake engagement member 28 by means of connecting rods 118, are biased towards the right as shown in FIG. 1.

The annular ring 32 is fixedly and sealingly attached to the exterior surface 112 of the first annular section 44 of the drive housing 18 by attachment ring 122. The outside surface of the annular ring 32 is sealingly and slidably engaged with the inside surface of the first annular section 106 of the clutch engagement member 30 forming sealed chamber 128.

When the engagement members 28 and 30 are biased to the right by the plurality of coil springs 120 as shown in FIG. 1, the first and second brake plates 14 and 16 are clamped between the brake engagement member 28 and the brake reaction pad 52 thus prohibiting rotation of the drive housing 18 by locking it to brake reaction cylinder 12. The flywheel drive 24 is free to rotate relative to the drive housing 18 due to the lack of clamping force between the clutch plates 20 and 22 by the biasing of the clutch engagement member 30 to the right as shown in FIG. 1. When pressure is applied to sealed chamber 128, the engagement members 28 and 30 are moved to the left as shown in FIG. 1. This movement to left of the brake engagement member 28 and the clutch engagement member 30 releases the clamping force on brake plates 14 and 16 by the brake engagement member 28 against the brake reaction pad 52 and exerts a clamping force between the clutch engagement member 30 and the clutch reaction ring 67 on clutch plates 20 and 22. The drive member 18 is now free to rotate relative to brake reaction cylinder 12 and is locked or rotates with flywheel drive 24.

The detailed description above describes the basic operation of the base unit 10. The operation of the base unit 10 is identical throughout the specification. The following description details how various designs of presses can be modified or adapted to incorporate the above base unit 10.

FIG. 2 shows the clutch/brake apparatus 10 adapted to be used as an integral unit 210. The integral unit 210 is needed when the clutch/brake apparatus 10 is to be mounted between bearings.

In this embodiment, the press is adapted with a driveshaft 212, a support housing 214, a first support arm 216 and a second support arm 218. The driveshaft 212 is fixedly mounted to the drive housing 18 of the clutch/brake apparatus 10. The driveshaft 212 is rotatably mounted to support housing 214 by bearing 220 and provides a mounting surface 222 for bearing 224 for the flywheel 226. Also provided within the drive shaft 212 is oil passage 228 which extends axially through drive shaft 212 to cooperate with oil passage 230 which extends generally perpendicular to the center axis 26, these passages 228 and 230 cooperate with oil passage 232 which extends through the drive housing 18 and terminates in sealed chamber 128. A rotary oil coupling 234 is rotatably mounted on the end of drive shaft 212 and is connected to a supply of pressurized oil (not shown) which enables the activation of the clutch/drive mechanism as described above.

The support housing 214 is fixedly attached to a non-rotatable section (not shown) of the press being adapted. The support housing 214 includes an oil inlet passage 236, an oil outlet passage 238, a bearing mounting surface 240 and spline means 258. An end cap 244 is mounted on one end of the support housing 214 and provides a mounting surface 246 for seal 248. The seal 248 is stationary with respect to support housing 214 and rides against the outside surface of driveshaft 212. The bearing mounting surface 240 is used to mount bearing 252 for the flywheel 226. The bearing 252 is held in position by annular ring 254 which is fixedly attached to the brake reaction cylinder 12. The exterior surface of the support housing 214 defines spline means 258 for engaging the brake reaction cylinder 12 of the brake/clutch unit 10. For this embodiment, the brake reaction cylinder 12 is equipped with an integral spline 260 for fixedly engaging the support housing and thus prohibiting brake reaction cylinder 12 from rotating.

The first support arm 216 is comprised of annular section 262, conical section 264 and annular ring 266. The annular section 262 has an internal surface which is adapted to mount bearing 252 as well as seal 270. Seal 270 rotates with the first support arm and ride against the support housing 214. The conical section 264 is fixedly and sealingly attached at one end to the annular section 262 and to the annular ring 266 at the other. Annular ring 266 is adapted to be fixedly and sealingly connected by the threaded holes 76 to the flywheel drive 24 by bolts 272. The flywheel 226 is fixedly attached to the flywheel drive 24 using holes 78.

The second support arm 218 is comprised of annular ring 274, conical section 276, annular ring 278 and bearing mount 280. The annular ring 274 is adapted to be fixedly and sealingly connected by the threaded holes 76 to the flywheel drive 24 by bolts 282. The conical section 276 is fixedly and sealingly connected to the annular ring 274 at one end and to the annular ring 278 at the other. The annular ring 274 is sealingly and fixedly connected to the bearing mount 280 by a plurality of bolts 284. The bearing mount 280 has an internal surface 286 which is adapted for mounting bearing 224 as well as seal 288. Seal 288 rotates with the second support arm 218 and rides against the driveshaft 212. The bearing 224 is held in place by retaining ring 290 which is fixedly mounted to bearing mount 280.

The support housing 214, first support arm 216, second support arm 218, driveshaft 212 and clutch/brake apparatus 10 cooperate to form sealed chamber 292. Sealed chamber 292 is sealed from the outside by seal 248, seal 270 and seal 288. The oil passage 236 communicates with sealed chamber 292 for cooling oil to enter chamber 292 and oil passage 238 communicates with sealed chamber 292 for cooling oil to exit chamber 292. By connecting the oil passages 236 and 238 to an oil pump (not shown), reservoir (not shown), and cooling coils (not shown), a continuous supply of cooled oil can be provided to dissipate the heat generated during the operation of the clutch/brake apparatus 10.

An oil dam 294 is attached to support housing 214 to accumulate any oil which may leak past seal 270. An outlet port 296 is provided which returns the accumulated oil to the reservoir (not shown) by tube 298.

FIG. 3 shows a clutch/brake unit 310 that has been modified for a press which has the flywheel and clutch quill mounted with the brake being on the opposite side of the press driveshaft and is designated by reference numeral 310.

In this embodiment, the press is adapted with a driveshaft 312, a second support arm 314 and a housing 316. The drive housing 18 of clutch/brake apparatus 10 has been modified and is designated in this embodiment by drive housing 318 serves as the output means and. The drive housing 318 is identical to drive housing 18 except for the internal configuration which mates with the press. The portions of drive housing which comprise working components with respect to clutch/brake apparatus 10 are the same as drive housing 18.

Drive housing 318 has a spline ring 320 fixedly attached to one end to its interior surface 322. The spline ring has an internal spline 324 which is used to connect to the driveshaft 312 of the press being adapted. Disposed between the internal spline 324 and the internal surface 322 are a plurality of oil passages 326. The other end of drive housing 318 extends axially and has bearing mount 332 for mounting bearing 334, oil passage 336, oil passage 338, and oil passage 340. Oil passage 338 extends axially through driveshaft 312 to cooperate with oil passage 340 which extends generally perpendicular to the center axis 26 and terminates in sealed chamber 128. A rotary oil coupling 342 is rotatably mounted on the end of drive housing 318 and is connected to a supply of pressurized oil (not shown) which enables the activation of the clutch/drive mechanism as described above.

The driveshaft 312 has an external spline 344 which mates with internal spline 324 to fixedly mount driveshaft 312 to drive housing 318. The brake reaction cylinder 12 is fixedly mounted to a non-rotating member of the press being adapted by using holes 50. A seal 346 is located on the interior surface of brake reaction cylinder 12 and rides against driveshaft 312. The flywheel 348 is fixedly attached to the flywheel drive 24 using holes 78. A seal (not shown) provides a sealed connection between the flywheel 348 or flywheel adapter (not shown) and the non-rotating portion of the press.

The second support arm 314 is comprised of annular ring 350, conical section 352, annular ring 354 and bearing mount 356. The annular ring 350 is adapted to be fixedly and sealingly connected by the threaded holes 76 to the flywheel drive 24 by bolts 358. The conical section 352 is fixedly and sealingly connected to the annular ring 350 at one end and to the annular ring 354 at the other. The annular ring 354 is sealingly and fixedly connected to the bearing mount 356 by a plurality of bolts 360. The bearing mount 356 has an internal surface which is adapted for mounting bearing 330. The bearing 330 is held in place by retaining ring 364 which is fixedly mounted to bearing mount 356 by bolts 366.

A seal 368 is mounted to the interior surface of retaining ring 364. The seal 368 rotates with the retaining ring 364 and rides against the exterior surface of the housing 316. The housing 316 is rotatably supported on drive housing 318 by bearing 334 and bushing 374. An end cap 376 is fixedly and sealingly mounted to the housing 316 and provides an interior surface for mounting seal 380. Seal 380 is fixed in relationship to housing 316 and rides against drive housing 318. The seal 380 creates a chamber 382 for routing of cooling oil as will be described later herein. The housing 316 has a pair of oil passages 386 and 388 each passage being on an opposite side of bushing 374.

The driveshaft 312, the second of bushing 374, support arm 314, the housing 316, the clutch/brake unit 10 and the press being modified cooperate to form a sealed chamber 384. Sealed chamber 384 is sealed from the outside by seal 346, seal 368 and seal 380.

The oil passage 386 communicates with sealed chamber 384 for cooling oil to enter chamber 384. Oil passage 336 in drive housing 318 communicates with both sealed chamber 384 and chamber 382. Chamber 382 communicates with oil passage 388 thus providing a route for cooling oil to exit the sealed chamber 384. By connecting the oil passages 386 and 388 to an oil pump (not shown), a reservoir (not shown), and cooling coils (not shown) a continuous supply of cooled oil can be provided to dissipate the heat generated and lubricate the components during the operation of the clutch/brake apparatus 10.

An oil dam 392 is attached to end cap 376 and retaining ring 364 to accumulate any oil which may leak past seals 368 and 380. An outlet port 394 is provided which returns the accumulated oil to the reservoir (not shown) by tube 396.

FIG. 4 shows a clutch/brake unit 410 that has been modified for a press which has the flywheel and clutch quill mounted with the brake being on the opposite side of the press driveshaft and is designated by reference numeral 410.

This embodiment is identical to the embodiment shown in FIG. 3 except for the driveshaft 412 configuration. For this embodiment, the driveshaft 412 from the press extends completely through the clutch/drive unit 410. This eliminates the need to modify the drive housing 18 and it is now fixedly mounted to driveshaft 412 as shown in FIG. 4. The remainder of the clutch/drive unit 410 is identical to that of FIG. 3.

FIG. 5 shows a clutch/brake unit 510 that has been modified for a press (not shown) which has the clutch and brake unit assembly separately mounted but the flywheel is not quill mounted.

The clutch/brake unit 510 operates identical to the clutch/brake unit 410 and 310 as shown in FIGS. 4 and 3 respectively. The differences between this embodiment is in the way in which the clutch/brake unit 510 is married to the press. The interfacing between the press and the clutch/brake unit 510 will be discussed in detail. Refer to discussion of FIGS. 3 and 4 for operation and construction of the remainder of the unit.

The clutch/brake unit 510 is comprised of driveshaft 512, support member 514 and first support arm 516. The driveshaft 512 extends completely through the clutch/brake unit 510 and is identical to driveshaft 412 except that it is not a modified component of the original press. Driveshaft 512 has a male spline 518 on the end of the driveshaft 512 adjacent the press for fixedly connecting to the driveshaft (not shown) of the press. The exterior surface of the driveshaft 510 is adapted for mounting bearing 520 which rotatably locates driveshaft 510 within support member 514.

Support member 514 is comprised of circular ring 522 and annular section 524. The circular ring 522 is fixedly mounted to a non-rotating member 525 of the press being adapted. The annular section 524 extends axially from the inside diameter of circular ring 522 and has an outer surface which is adapted to mount a pair of bearings 528 for rotatably mounting the flywheel 530. The end of the annular section 524 opposite the circular ring 522 is adapted for fixedly connecting the brake reaction cylinder 12 by using holes 50 and bolts 532. This connection anchors the brake reaction cylinder 12 by its connection to non rotating member 525 of the press through support member 514. A seal 534 is fixedly attached to support member 514 and rides against driveshaft 512 for sealing chamber 384'.

The first support arm 516 is comprised of bearing mount 540, conical section 542 and annular ring 544. The bearing mount 540 has an internal surface which is adapted for mounting bearings 528. An end cap 548 is fixedly mounted to the end of bearing mount 540 for mounting seal 550. Seal 550 rotates with the first support arm 516 and rides against support member 514. The conical section 542 is fixedly and sealingly attached at one end to bearing mount 540 and to annular ring 544 at the other end. Annular ring 544 is adapted to be fixedly and sealingly connected to the threaded holes 76 of the flywheel drive 24 by bolts 552. The first support arm is used to help define the chamber 384' which holds the cooling oil. The remainder of the clutch/brake unit 510 is identical to the clutch/brake unit 310 discussed in FIG. 3 above.

While the above detailed description describes the preferred embodiment of the present invention, it should be understood that the present invention is susceptible to modification, variation and alteration without deviating from the scope and fair meaning of the subjoined claims.

What is claimed is:

1. An apparatus in combination with an oil shear clutch brake unit, said oil clutch brake unit comprising:
   support means for anchoring said clutch brake unit to a non-rotatable member of said apparatus;
   input means for receiving rotary motion from said apparatus, said input means rotatable with respect to said support means and disposed in coaxially spaced relation thereabout;
   output means for transmitting rotary motion from said clutch brake unit, said output means rotatable with respect to said support means and disposed between said support means and said input means in coaxially spaced relation thereabout, said output means including a drive ring and an annular collar extending from said drive ring for rotation therewith and disposed in coaxially spaced relation thereabout;
   selectively operable brake means for prohibiting rotation to said output means from said input means, said brake means including a plurality of interleaved first friction disks alternately splined, respectively, to said support means and said collar, said first friction disks extending axially between first and second ends of said brake means;
   selectively operable clutch means for transmitting rotational motion from travelling of said output means with respect to said support means, said clutch means including a plurality of interleaved second friction disks alternately splined, respectively, to said input means and said collar, said second friction disks extending axially between first and second ends of said clutch means;
   said collar including first and second axially spaced stops, respectively, proximate said first and second ends, said collar mounting said brake means radially inward of and in coaxial nested relation to said clutch means;
   first piston means for engaging said brake means, said first piston means slidably disposed in said collar adjacent said first end of said first disk members and axially movable towards said second stop adjacent to said second end of said first disk members;
   spring means for urging said first piston means into contact with said first friction disks and said first friction disks into compressed engagement with said second stop whereby to engage said brake means and prohibit rotation of said output means;
   second piston means for engaging said clutch means, said second piston means slidably disposed on said collar adjacent to said second end of said second disk members and axially movable towards said first stop adjacent to said first end of said second disk members;
   actuating means for connecting said first and second piston means together;
   pressure chamber means adjacent said second piston means for selectively moving said first piston means against said spring means to disengage said brake means when said chamber means is pressurized and substantially simultaneously moving said second friction disks into compressed engagement with said first stop whereby to engage said clutch means and transmit rotation from said input means to said output means.

2. An apparatus in combination with an oil shear clutch brake unit, said oil clutch brake unit comprising
   input means for receiving rotary motion from said apparatus;
   output means for transmitting rotary motion from said clutch brake unit;
   selectively operable brake means for prohibiting rotation of said output means;
   selectively operable clutch means for transmitting rotation to said output means from said input means;
   said output means including first and second axially spaced stops, respectively, adjacent first and second ends of said brake means, said output means mounting said brake means radially inward of and in coaxial nested relation to said clutch means;
   first piston means slidably disposed within said output means and axially movable towards said second stop to engage said brake means;
   second piston means slidably disposed on said output means and axially movable towards said first stop to engage said clutch means;
   spring means for urging said first piston means towards said second stop to engage said brake and prohibit rotation of said output means; said spring means further simultaneously urging said second piston means away from said first stop to disengage said clutch;
   pressure chamber means for connecting said first and second piston means for selectively moving said first piston means against said spring means to disengage said brake means when said chamber is pressurized and substantially simultaneously moving said second piston means against said spring means to engage said clutch and transmit rotation from said input means to said output means.

3. The oil shear clutch brake unit of claim 2 wherein said brake means comprises a plurality of interleaved first friction disks alternatly splined, respectively, to a non-rotating member of said clutch brake unit and said output means.

4. The oil shear clutch brake unit of claim 2 wherein said clutch means comprises a plurality of interleaved second friction disks alternately splined, respectively, to said input means and said output means.

* * * * *